United States Patent
Inoue et al.

(10) Patent No.: US 11,674,493 B2
(45) Date of Patent: Jun. 13, 2023

(54) CONTROLLER AND CONTROL METHOD FOR INTERNAL COMBUSTION ENGINE

(71) Applicant: Mitsubishi Electric Corporation, Tokyo (JP)

(72) Inventors: Junichi Inoue, Tokyo (JP); Yuhei Matsushima, Tokyo (JP); Toshikatsu Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/763,030

(22) PCT Filed: Dec. 4, 2019

(86) PCT No.: PCT/JP2019/047330
§ 371 (c)(1),
(2) Date: Mar. 23, 2022

(87) PCT Pub. No.: WO2021/111535
PCT Pub. Date: Jun. 10, 2021

(65) Prior Publication Data
US 2022/0333570 A1    Oct. 20, 2022

(51) Int. Cl.
*F02P 5/15* (2006.01)
*F02P 5/152* (2006.01)
*F02D 13/02* (2006.01)
*F02D 35/02* (2006.01)

(52) U.S. Cl.
CPC .......... *F02P 5/152* (2013.01); *F02D 13/0215* (2013.01); *F02D 35/027* (2013.01); *F02D 2200/025* (2013.01)

(58) Field of Classification Search
CPC .... F02P 5/152; F02D 13/0215; F02D 35/027; F02D 2041/001; F02D 2041/288; F02D 2200/0406; F02D 2200/025
USPC .... 123/435, 406.21, 406.29, 406.38, 406.39; 701/111; 73/35.09, 114.07
See application file for complete search history.

(56) References Cited

U.S. PATENT DOCUMENTS
2006/0129304 A1    6/2006   Takemura et al.

FOREIGN PATENT DOCUMENTS
JP    2582969 B2   2/1997
JP    4605642 B2   1/2011

OTHER PUBLICATIONS
International Search Report for PCT/JP2019/047330 dated, Feb. 18, 2020 (PCT/ISA/210).

*Primary Examiner* — Hai H Huynh
(74) *Attorney, Agent, or Firm* — Sughrue Mion, PLLC; Richard C. Turner

(57) ABSTRACT

To provide a controller and a control method for internal combustion engine which can suppress the increase in the calculation processing load for determining occurrence of the mechanical noise and occurrence of the knocking with good accuracy even when the mechanical noise occurs. When the maximum value of the strength of the component of the second frequency band in the comparison period exceeds the maximum value of the strength of the component of the first frequency band, a controller for internal combustion engine performs a second side stop determination processing that determine whether the knocking occurred, based on the strength of the component of the first frequency band, without using the strength of the component of the second frequency band.

8 Claims, 11 Drawing Sheets

FIG. 6

CONTROLLER AND CONTROL METHOD FOR INTERNAL COMBUSTION ENGINE

CROSS REFERENCE TO RELATED APPLICATIONS

This application is a National Stage of International Application No. PCT/JP2019/047330 filed Dec. 4, 2019.

TECHNICAL FIELD

The present disclosure relates to a controller and a control method for internal combustion engine.

BACKGROUND ART

Previously, the controller which detects the knocking phenomenon which occurs in the internal combustion engine by the vibration sensor (hereinafter, referred to as the knocking sensor) directly attached to the combustion chamber block of the internal combustion engine is known. When the knocking occurs during operation of the internal combustion engine, since vibration of the natural frequency band occurs according to the bore size of the internal combustion engine and the vibration mode of knocking, the controller detects the knocking by measuring the vibration strength of this natural frequency.

However, since the above vibration sensor detects not only the vibration by knocking, but also the mechanical noise generated by the internal combustion engine, it is necessary to detect the knocking while avoiding such mechanical noise.

As the technology of performing such knocking control, the technologies described in the following PLT 1 and PLT 2 are already known, for example.

The following technology is disclosed in PLT 1. When it is determined that the knocking occurred and the noise did not occur using two frequency components for determination of knocking occurrence and at least one frequency component for determination of noise occurrence, the ignition timing is retarded.

The following technology is disclosed in PLT 2. Occurrence of noise is determined based on feature of distribution of the knocking signal (peak values in the knocking window of the knocking frequency band). Specifically, the distribution shape (mean value, variance) of the peak values of the knocking signal is calculated, and the presence or absence of noise is determined based on the ratio between the variance and the mean value.

CITATION LIST

Patent Literature

PLT 1: JP 2582969 B
PLT 2: JP 4605642 B

SUMMARY OF INVENTION

Technical Problem

However, in the technology of PLT 1, analysis of the frequency band only for the noise determination is performed. And, analyses of three or more frequency bands are necessary, and the computation load increases. In the technology of PLT 2, it is necessary to calculate the mean value and the variance, and determination of knocking and noise cannot be performed until those calculations are completed.

Then, it is required to provide a controller and a control method for internal combustion engine which can suppress the increase in the calculation processing load for determining occurrence of the mechanical noise and determine occurrence of the knocking with good accuracy, even when the mechanical noise occurs.

Solution to Problem

A controller for internal combustion engine according to the present disclosure including:
- a knocking signal calculation unit that calculates a strength of a component of a first frequency band and a strength of a component of a second frequency band which are included in an output signal of a knocking sensor provided in an internal combustion engine, wherein the second frequency band is a higher frequency than the first frequency band; and
- a knocking determination unit that determines whether knocking occurred in a combustion stroke, based on the strength of the component of the first frequency band and the strength of the component of the second frequency band which were calculated in a knocking determination period which is set corresponding to the combustion stroke,
- wherein when a maximum value of the strength of the component of the second frequency band in a comparison period which is set corresponding to the knocking determination period exceeds a maximum value of the strength of the component of the first frequency band in the comparison period, the knocking determination unit performs a second side stop determination processing that determines whether the knocking occurred, based on the strength of the component of the first frequency band, without using the strength of the component of the second frequency band.

A control method for internal combustion engine according to the present disclosure including:
- a knocking signal calculation step of calculating a strength of a component of a first frequency band and a strength of a component of a second frequency band which are included in an output signal of a knocking sensor provided in an internal combustion engine, wherein the second frequency band is a higher frequency than the first frequency band; and
- a knocking determination step of determining whether knocking occurred in a combustion stroke, based on the strength of the component of the first frequency band and the strength of the component of the second frequency band which were calculated in a knocking determination period which is set corresponding to the combustion stroke,
- wherein in the knocking determination step, when a maximum value of the strength of the component of the second frequency band in a comparison period which is set corresponding to the knocking determination period exceeds a maximum value of the strength of the component of the first frequency band in the comparison period, performing a second side stop determination processing that determines whether the knocking occurred, based on the strength of the component of the first frequency band, without using the strength of the component of the second frequency band.

Advantage of Invention

According to the controller and the control method for internal combustion engine of the present disclosure, when performing a normal determination processing in which the second side stop determination processing is not performed, since the presence or absence of knocking occurrence is determined based on the strength of the component of the first frequency band and the strength of the component of the second frequency band in the knocking determination period, even if a tendency difference of frequency band occurs according to a kind of the knocking, the knocking occurrence can be detected with good sensitivity. On the other hand, to the mechanical noise, because of only determining whether the maximum value of the strength of the component of the frequency band in the comparison period which is set corresponding to the determination period exceeds the maximum value of the strength of the component of the frequency band in the comparison period, determination can be performed by the simple processing which determines the maximum value of the strength of the component of the first frequency band and the maximum value of the strength of the component of the second frequency band which were calculated for determination of knocking occurrence, and compares these. Without using the strength of the component of the second frequency band on which the mechanical noise is superimposed, based on the strength of the component of the first frequency band, it is determined whether the knocking occurred or not. Accordingly, even if the mechanical noise is superimposed, occurrence of the knocking can be determined with good accuracy.

BRIEF DESCRIPTION OF THE DRAWINGS

FIG. 6 is a figure for explaining the behavior in knocking non-occurrence according to Embodiment 1;

DETAILED DESCRIPTION OF THE EMBODIMENTS

1. Embodiment 1

Figure 1:
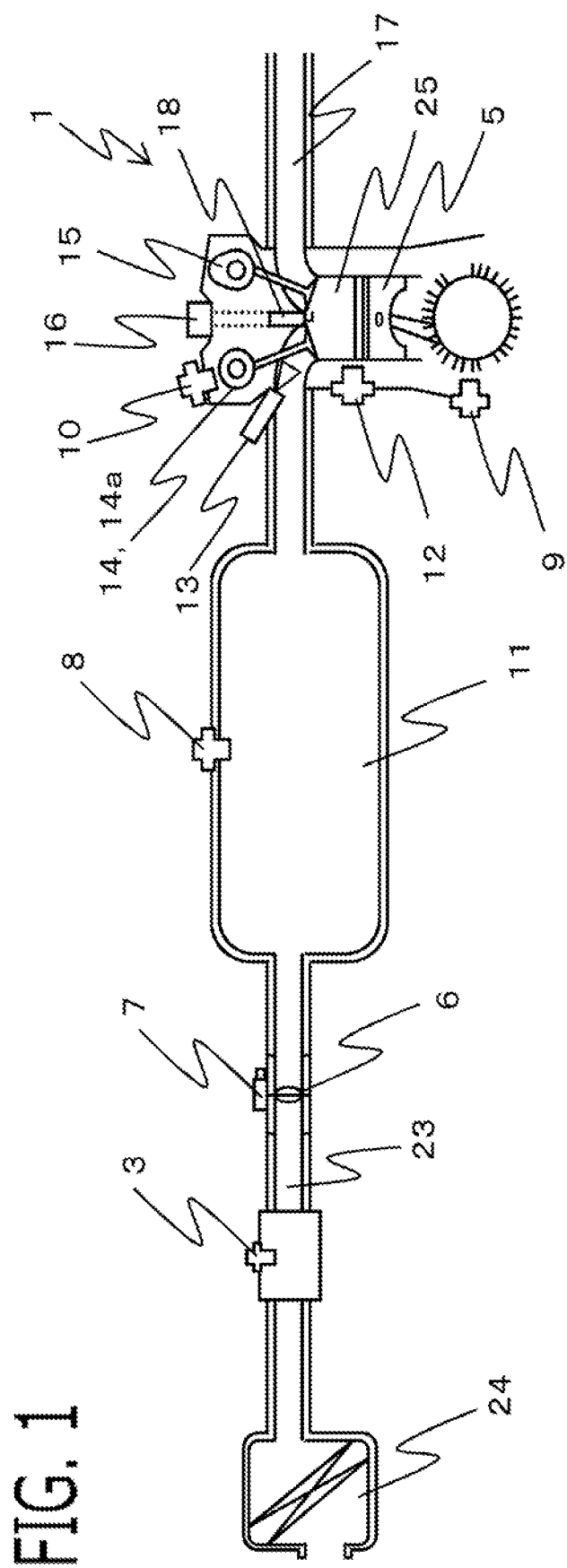
FIG. 1 is a schematic configuration diagram of the internal combustion engine according to Embodiment 1.

A controller 50 for internal combustion engine 1 (hereinafter, referred to simply as the controller 50) according to Embodiment 1 will be explained with reference to the drawings. FIG. 1 is a schematic configuration diagram of the internal combustion engine 1 according to the present embodiment. Although the internal combustion engine 1 is provided with a plurality of combustion chambers 25 (for example, three) according to the present embodiment, only the one combustion chamber 25 is shown in FIG. 1 for convenience. The internal combustion engine 1 and the controller 50 are mounted in a vehicle; the internal combustion engine 1 functions as a driving-force source for the vehicle (wheels).

1-1. Configuration of Internal Combustion Engine 1

The configuration of the internal combustion engine 1 will be explained. The internal combustion engine 1 has a combustion chamber 25 in which a fuel-air mixture is combusted. The internal combustion engine 1 is provided with an intake path 23 for supplying air to the combustion chamber 25 and an exhaust path 17 for discharging exhaust gas from the combustion chamber 25. The internal combustion engine 1 has a throttle valve 6 for opening and closing the intake path 23. The throttle valve 6 is an electronically controlled throttle valve which is opening/closing-driven by an electric motor controlled by the controller 50. The throttle valve 6 is provided with a throttle opening degree sensor 7 which generates an electric signal according to a throttle opening degree of the throttle valve 6.

An air cleaner 24 for purifying air taken into the intake path 23 is provided at the most upstream part of the intake path 23. An air flow sensor 3 which outputs an electric signal according to an intake air amount taken into the intake path 23 is provided in a part of the intake path 23 at the upstream side of throttle valve 6. The part of the intake path 23 at the downstream side of the throttle valve 6 is an intake manifold 11, and is connected to a plurality of combustion chambers 25. The upstream side part of the intake manifold 11 is a surge tank for suppressing an intake pulsation.

A manifold pressure sensor 8 which outputs an electric signal according to a manifold pressure which is a gas pressure in the intake manifold 11 is provided in the intake manifold 11. Either one of the air flow sensor 3 or the manifold pressure sensor 8 may be provided. An injector 13 for injecting a fuel is provided at the downstream side part of the intake manifold 11. The injector 13 may be provided in such a way as to inject a fuel directly into the combustion chamber 25.

An ignition plug 18 for igniting a fuel-air mixture and an ignition coil 16 for supplying ignition energy to the ignition plug 18 are provided on the top of the combustion chamber 25. On the top of the combustion chamber 25, there are provided an intake valve 14 for adjusting the amount of intake air to be taken from the intake path 23 into the combustion chamber 25 and an exhaust valve 15 for adjusting the amount of exhaust gas to be exhausted from the combustion chamber 25 to the exhaust path 17. The intake valve 14 is provided with an intake variable valve timing mechanism 14a which makes the opening and closing timing thereof variable. The intake variable valve timing mechanism 14a has an electric actuator which changes the opening and closing timing of the intake valve.

A crankshaft of the internal combustion engine 1 is provided with a signal plate in which a plurality of teeth were provided in the outer circumference with the preliminarily set angle interval. A crank angle sensor 9 is fixed to a cylinder block so as to oppose the tooth of the signal plate of the crankshaft and outputs a pulse signal synchronizing with passage of the tooth. Although not shown in the figure, a cam shaft of the internal combustion engine 1 is provided with a signal plate in which a plurality of teeth were provided in the outer circumference with the preliminarily set angle interval. A cam angle sensor 10 is fixed so as to oppose the tooth of the signal plate of the cam shaft and outputs a pulse signal synchronizing with passage of the tooth.

Based on two kinds of output signals of the first crank angle sensor 9 and the cam angle sensor 10, the controller 50 detects a crank angle on the basis of the top dead center of each piston 5 and determines a stroke of each combustion chamber 25.

A knocking sensor 12 is fixed to the cylinder block. The knocking sensor 12 outputs a signal (vibration waveform signal) according to vibration of the internal combustion engine 1. The knocking sensor 12 is configured by the piezoelectric element or the like.

1-2. Configuration of Controller 50

Figure 2:
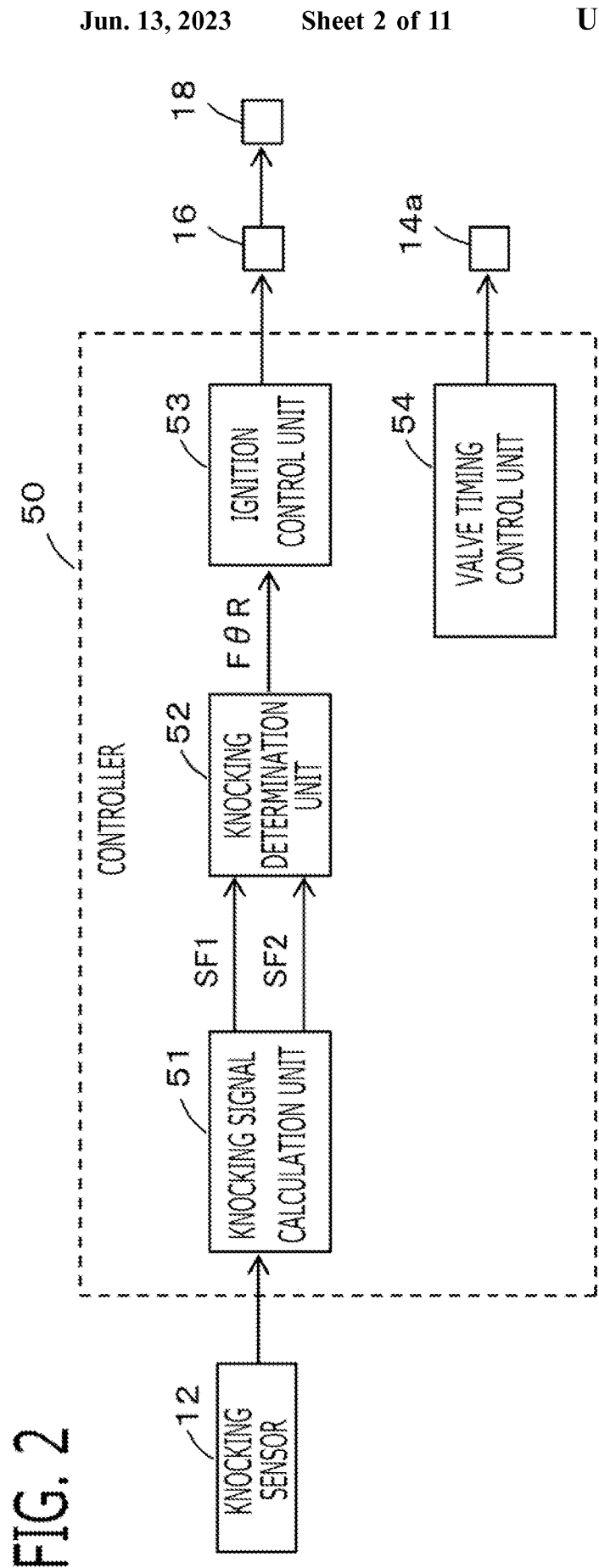
FIG. 2 is a block diagram of the controller according to Embodiment 1.
Figure 3:
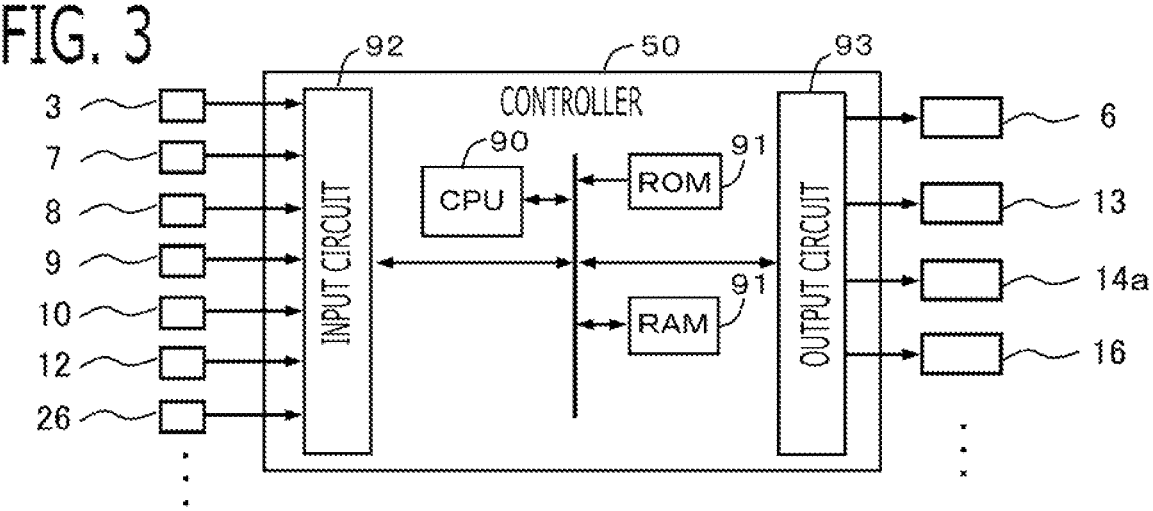
FIG. 3 is a hardware configuration diagram of the controller according to Embodiment 1.

Next, the controller 50 will be explained. The controller 50 is the one whose control object is the internal combustion engine 1. As shown in the block diagram of FIG. 2, the controller 50 is provided with control units such as a knocking signal calculation unit 51, a knocking determination unit 52, an ignition control unit 53, and a valve timing control unit 54. The respective control units 51 to 54 of the controller 50 are realized by processing circuits provided in the controller 50. Specifically, as shown in FIG. 3, the controller 50 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

In addition, the computing processing unit 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 to 54 provided in the controller 50 are realized. Setting data items such as threshold values and a knocking determination period to be utilized in the control units 51 to 54 are stored, as part of software items (programs), in the storage apparatus 91 such as a ROM.

In the present embodiment, the input circuit 92 is connected with the air flow sensor 3, the throttle position sensor 7, the manifold pressure sensor 8, the crank angle sensor 9, the cam angle sensor 10, the knocking sensor 12, the accelerator position sensor 26, and the like. The output circuit 93 is connected with the throttle valve 6 (electric motor), the injector 13, the intake variable valve timing mechanism 14a, the ignition coil 16, and the like. The controller 50 is connected with various kinds of unillustrated sensors, switches, actuators, and the like.

The controller 50 detects an intake air amount based on the output signal of the air flow sensor 3 or the manifold pressure sensor 8 and the like, detects a throttle opening angle based on the output signal of the throttle position sensor 7, and detects an accelerator opening degree based on the output signal of the accelerator position sensor 26. The controller 50 detects a crank angle, a rotational speed, and an opening and closing timing of the intake valve 14, based on the output signal of the crank angle sensor 9 and the cam angle sensor 10.

As basic control, the controller 50 calculates a fuel injection amount, an ignition timing, and the like, based on inputted output signals and the like from the various kinds of sensors, and then performs driving control of the injector 13, the ignition coil 16, and the like. The ignition control is described below. Based on the accelerator opening degree and the like, the controller 50 calculates the output torque of the internal combustion engine 1, demanded by the driver, and then controls the throttle valve 6 and the like so that an intake air amount for realizing the demanded output torque is obtained. Specifically, the controller 50 calculates a target throttle opening degree and then performs driving control of the electric motor for the throttle valve 6 so that the throttle opening degree approaches the target throttle opening degree.

The valve timing control unit 54 calculates a target opening and closing timing of the intake valve 14 based on the rotational speed, the intake air amount, and the like of the internal combustion engine, and performs driving control of the electric actuator of the intake variable valve timing mechanism 14a so that the opening and closing timing of the intake valve 14 approaches the target opening and closing timing.

1-2-1. Knocking Signal Calculation Unit 51

The knocking signal calculation unit 51 calculates a strength SF1 of a component of a first frequency band F1 and a strength SF2 of a component of a second frequency band F2 which are included in the output signal of the knocking sensor 12. The second frequency band F2 is set higher than the first frequency band F1.

Figure 4:
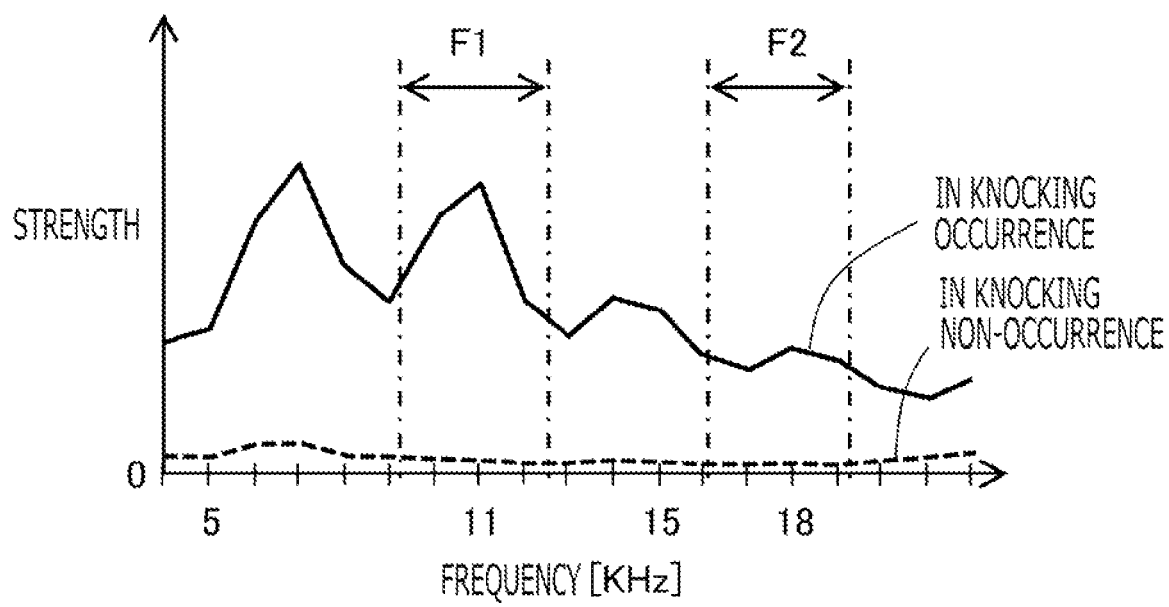
FIG. 4 is a figure for explaining the frequency characteristic of the knocking sensor signal according to Embodiment 1.

FIG. 4 shows an example of characteristics between the frequency and the strength of the output signal of the knocking sensor 12 at each frequency in occurrence and non-occurrence of knocking. As shown in this characteristics, when knocking occurs, the strength of the knock sensor signal increases in all frequency. Especially, in the plurality of specific frequency bands, the strength of the signal becomes higher, and the detectability of knocking is improved. As the frequency becomes higher, the strength of the signal in occurrence of knocking decreases.

For example, as shown in FIG. 4, the first frequency band F1 and the second frequency band F2 are set to the frequency bands in each of which the strength in occurrence of knocking becomes higher than the neighboring frequency. For example, the first frequency band F1 is set to a frequency band including 11 kHz, and the second frequency band F2 is set to a frequency band including 18 kHz.

In occurrence of knocking, the strength of the component of the second frequency band F2 becomes lower than the strength of the component of the first frequency band F1. The first frequency band F1 and the second frequency band F2 may not be set to a frequency bands in each of which the strength in occurrence of knocking becomes higher than the neighboring frequency.

In the present embodiment, the knocking signal calculation unit 51 calculates the strength of the component of the first frequency band SF1 and the strength of the component of the second frequency band SF2, by performing a Fourier transform processing or a band pass filter processing to the output signal of the knocking sensor 12.

For example, the knocking signal calculation unit 51 performs, as the Fourier transform processing, a discrete Fourier transform (DFT) or a short time Fourier transform (STFT) to the output signal of the knocking sensor 12 at every predetermined period, and calculates a spectrum column of the first frequency band F1 and a spectrum column of the second frequency band F2. Then, the knocking signal calculation unit 51 calculates a peak value or an average value of the spectrum column of the first frequency band F1 as the strength of the component of the first frequency band SF1, and calculates a peak value or an average value of the spectrum column of the second frequency band F2 as the strength of the component of the second frequency band SF2.

Alternatively, the knocking signal calculation unit 51 performs, as the band pass filter processing, an infinite impulse response (IIR) filter or a finite impulse response (FIR) filter to the output signal of the knocking sensor 12 at every predetermined period, and extracts the component of the first frequency band F1 and the component of the second frequency band F2. The knocking signal calculation unit 51 calculates an amplitude of the component of the first frequency band F1 as the strength of the component of the first frequency band SF1, and calculates an amplitude of the component of the second frequency band F2 as the strength of the component of the second frequency band SF2.

1-2-2. Knocking Determination Unit 52

<Normal Determination Processing>

When performing a normal determination processing in which the second side stop determination processing described below is not performed, the knocking determination unit 52 determines whether the knocking occurred in the combustion stroke, based on the strength of the component of the first frequency band SF1 and the strength of the component of the second frequency band SF2 which were calculated in a knocking determination period which is set corresponding to the combustion stroke.

The knocking determination period of each combustion chamber 25 is set to a predetermined crank angle interval on the basis of the top dead center of the piston of each combustion chamber 25 (for example, a crank angle interval from 60 degrees before the top dead center to 90 degrees after the top dead center). The knocking determination period may be changed according to the operating condition, such as the rotational speed, the intake air amount, and the ignition timing.

The knocking determination unit 52 performs, in the knocking determination period, a first comparison which compares the strength of the component of the first frequency band SF1 with a first threshold value TH1, performs a second comparison which compares the strength of the component of the second frequency band SF2 with a second threshold value TH2, and determines whether the knocking occurred, based on one or both of a comparison result of the first comparison and a comparison result of the second comparison.

As shown in FIG. 4, in knocking occurrence, the strength of the component of the second frequency band F2 becomes less than the strength of the component of the first frequency band F1. Therefore, the second threshold value TH2 is set to a value less than the first threshold value TH1. The first threshold value TH1 and the second threshold value TH2 may be changed according to the operating condition, such as the rotational speed, the intake air amount, and the ignition timing. The first threshold value TH1 may be adaptively set based on a statistical value of the strength of the component of the first frequency band SF1, and the like. The second threshold value TH2 may be adaptively set based on a statistical value of the strength of the component of the second frequency band SF2, and the like.

Figure 5:
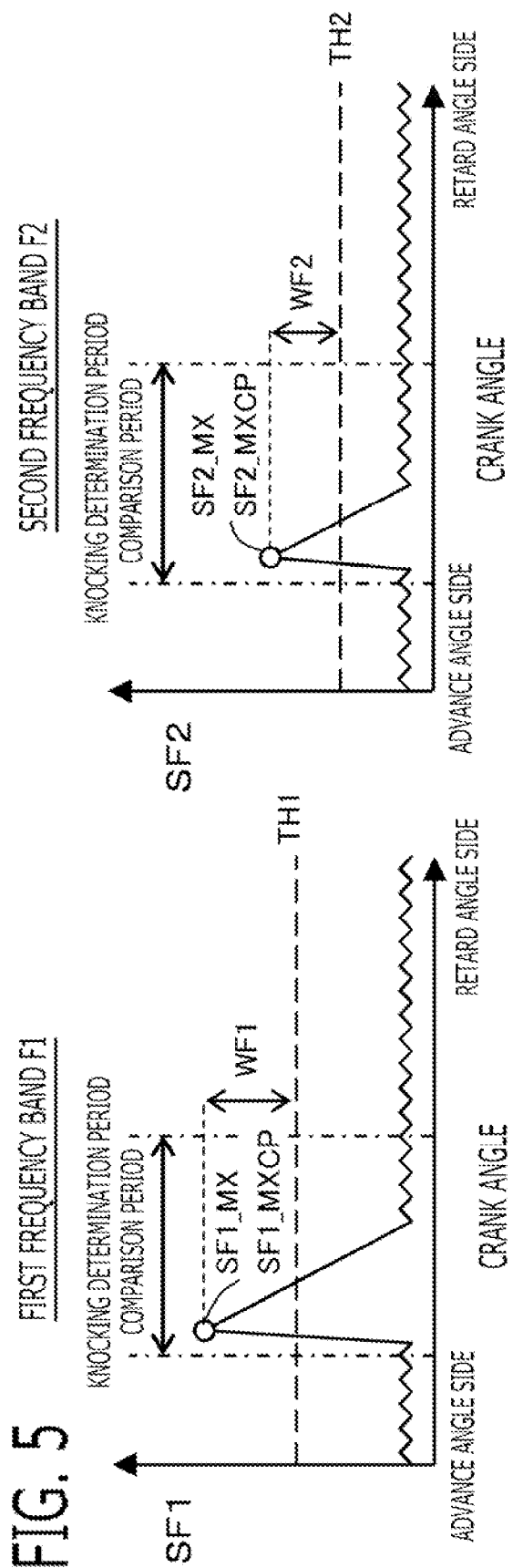
FIG. 5 is a figure for explaining the behavior in knocking occurrence according to Embodiment 1.
Figure 6:
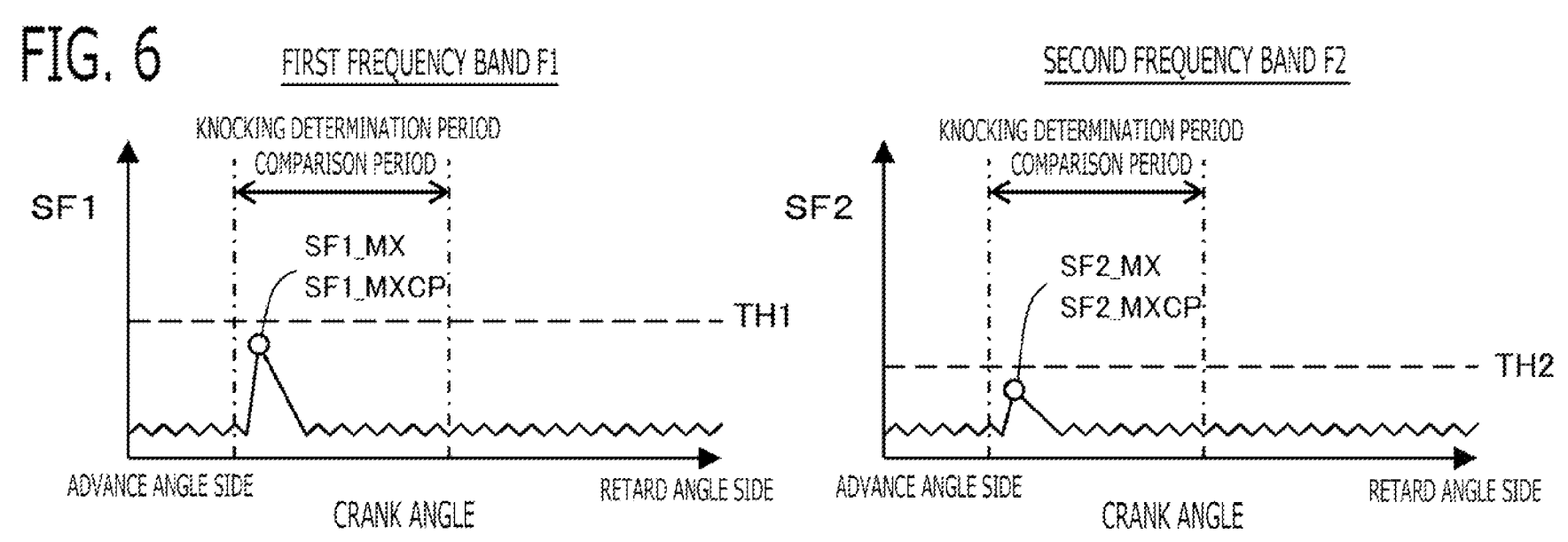

As shown in FIG. 5 and FIG. 6, as the first comparison, the knocking determination unit 52 determines a maximum value SF1_MX of the strength of the component of the first frequency band SF1 in the knocking determination period (hereinafter, referred to also as the first component strength maximum value SF1_MX), and determines whether the first component strength maximum value SF1_MX exceeds the first threshold value TH1. As the second comparison, the knocking determination unit 52 determines a maximum value SF2_MX of the strength of the component of the second frequency band SF2 in the knocking determination period (hereinafter, referred to also as the second component strength maximum value SF2_MX), and determines whether the second component strength maximum value SF2_MX exceeds the second threshold value TH2.

In the present embodiment, in the normal determination processing, when determining that at least one of the first component strength maximum value SF1_MX and the second component strength maximum value SF2_MX exceeds the first threshold value TH1 or the second threshold value TH2, the knocking determination unit 52 determines that the knocking occurred. And, when determining that both of the first component strength maximum value SF1_MX and the second component strength maximum value SF2_MX do not exceed the first threshold value TH1 or the second threshold value TH2, the knocking determination unit 52 determines that the knocking does not occur.

In this way, in the normal determination processing, since the knocking occurrence can be detected when at least one of the first component strength maximum value SF1_MX and the second component strength maximum value SF2_MX exceeds the threshold value, even if a tendency difference of frequency band occurs according to a kind of the knocking, the knocking occurrence can be detected with good sensitivity.

The knocking determination unit 52 changes the ignition timing based on the determination result of knocking occurrence. In the present embodiment, the knocking determination unit 52 calculates a retard angle amount of ignition timing $\theta R$, based on a first exceeding width WF1 that the strength of the component of the first frequency band SF1 (in this example, the first component strength maximum value SF1_MX) exceeds the first threshold value TH1, and a second exceeding width WF2 that the strength of the component of the second frequency band SF2 (in this example, the second component strength maximum value SF2_MX) exceeds the second threshold value TH2.

As shown in the next equation, when the first component strength maximum value SF1_MX exceeds the first threshold value TH1, the knocking determination unit 52 sets a value obtained by subtracting the first threshold value TH1 from the first component strength maximum value SF1_MX, as the first exceeding width WF1. And, when the first component strength maximum value SF1_MX does not exceed the first threshold value TH1, the knocking determination unit 52 sets 0 as the first exceeding width WF1.

1) When SF1_MX>TH1

$$WF1=SF1\_MX-TH1 \quad (1)$$

2) When SF1_MX<=TH1
WF1=0

And, as shown in the next equation, when the second component strength maximum value SF2_MX exceeds the second threshold value TH2, the knocking determination unit 52 sets a value obtained by subtracting the second threshold value TH2 from the second component strength maximum value SF2_MX, as the second exceeding width WF2. And, when the second component strength maximum value SF2_MX does not exceed the second threshold value TH2, the knocking determination unit 52 sets 0 as the second exceeding width WF2.

1) When SF2_MX>TH2

$$WF2=SF2\_MX-TH2 \quad (2)$$

2) When SF2_MX<=TH2
WF2=0

For example, as shown in the next equation, the knocking determination unit 52 calculates the retard angle amount of ignition timing θR, based on a square root of an addition value of a square value of the first exceeding width WF1, and a square value of the second exceeding width WF2. Herein, Kr1 is a reflection coefficient of the normal determination processing, and it is set to a positive value.

$$\theta R = -Kr1 \times \sqrt{(WF1^2 + WF2^2)} \quad (3)$$

<Erroneous Determination Due to Superposition of Mechanical Noise>

Figure 7:
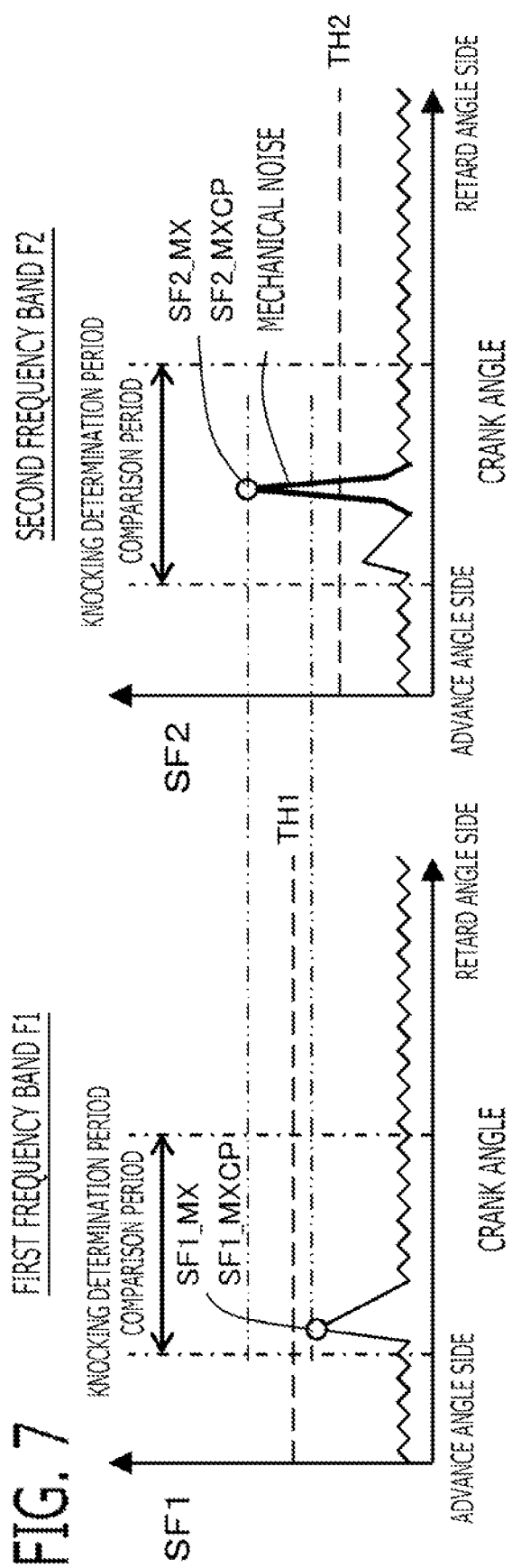
FIG. 7 is a figure for explaining the behavior when the mechanical noise is superimposed according to Embodiment 1.

The knocking sensor detects not only a vibration due to knocking but also a mechanical noise generated by the internal combustion engine. The mechanical noise includes a vibration component which is generated when the intake valves or the exhaust valves of other combustion chamber is seated on. The frequency band of the mechanical noise overlaps with the second frequency band F2. Accordingly, as shown in FIG. 7, when the mechanical noise is generated in the knocking determination period, the mechanical noise is superimposed on the component of the second frequency band F2. And, even though the knocking does not occur, the strength of the component of the second frequency band SF2 becomes large, and it is erroneously determined that the knocking occurred. When determined erroneously, the ignition timing is retarded, the torque decreases, and the fuel efficiency is deteriorated. Accordingly, it is desirable to prevent the erroneous determination of knocking due to superimposing of the mechanical noise.

Even in the condition where the mechanical noise is superimposed in non-occurrence of the knocking, since the mechanical noise is not superimposed on the component of the first frequency band F1 so much, the strength of the component of the first frequency band SF1 does not become large. Therefore, in the condition where the knocking does not occur, when the mechanical noise is superimposed, the strength of the component of the second frequency band SF2 becomes larger than the strength of the component of the first frequency band SF1.

According to the characteristics shown in FIG. 4, in the condition where the mechanical noise is not superimposed, when the knocking occurs, as shown in FIG. 5, the strength of the component of the first frequency band SF1 becomes larger than the strength of the component of the second frequency band SF2. In the condition where the mechanical noise is not superimposed, when the knocking does not occur, as shown in FIG. 6, the strength of the component of the first frequency band SF1 becomes larger than the strength of the component of the second frequency band SF2. When the occurrence level of vibration by burning is very low, the strength of the component of the first frequency band SF1 may become less than the strength of the component of the second frequency band SF2. However, in this case, since erroneous determination of knocking is not performed and occurrence determination of knocking is not performed, either, it is not necessary to consider.

Therefore, when the strength of the component of the second frequency band SF2 becomes larger than the strength of the component of the first frequency band SF1, it can be determined that the mechanical noise was superimposed. In that case, by performing the occurrence determination of knocking using the strength of the component of the first frequency band SF1, without using the strength of the component of the second frequency band SF2, it can prevent the erroneous determination that the knocking occurred.

<Second Side Stop Determination Processing>

Then, the knocking determination unit 52 determines whether a maximum value SF2_MXCP of the strength of the component of the second frequency band in a comparison period which is set corresponding to the knocking determination period exceeds a maximum value SF1_MXCP of the strength of the component of the first frequency band in the comparison period. When determining that it exceeds (that is, when determining that the mechanical noise is superimposed), the knocking determination unit 52 performs a second side stop determination processing which determines whether the knocking occurred based on the strength of the component of the first frequency band SF1, without using the strength of the component of the second frequency band SF2. On the other hand, when determining that it does not exceed (that is, when determining that the mechanical noise is not superimposed), the knocking determination unit 52 performs the normal determination processing mentioned above.

According to this configuration, by the simple processing which compares the magnitude relation between the maximum value SF2_MXCP of the strength of the component of the second frequency band and the maximum value SF1_MXCP of the strength of the component of the first frequency band, it can be determined whether the mechanical noise is superimposed on the strength of the component of the second frequency band SF2. And, when determining that the mechanical noise is superimposed, without using the strength of the component of the second frequency band SF2 on which the mechanical noise is superimposed, based on the strength of the component of the first frequency band SF1 on which the mechanical noise is not superimposed so much, the presence or absence of knocking occurrence can be determined with good accuracy. Therefore, it can prevent the erroneous determination that the knocking occurred due to the mechanical noise.

In the present embodiment, the comparison period is set to the knocking determination period. According to this configuration, not only the mechanical noise due to seating of the intake valve or the exhaust valve of other combustion chamber, all mechanical noises that are generated in the knocking determination period, such as a mechanical noise due to driving of the injector, can be evaluated.

When performing the second side stop determination processing, the knocking determination unit 52 determines whether the knocking occurred, based on the comparison result of the first comparison. In the present embodiment, in the second side stop determination processing, when determining that the first component strength maximum value SF1_MX exceeds the first threshold value TH1, the knocking determination unit 52 determines that the knocking occurred. When determining that the first component strength maximum value SF1_MX does not exceed the first threshold value TH1, the knocking determination unit 52 determines that the knocking does not occur.

In the second side stop determination processing, as shown in the equation (1), when the first component strength maximum value SF1_MX exceeds the first threshold value TH1, the knocking determination unit 52 sets a value obtained by subtracting the first threshold value TH1 from the first component strength maximum value SF1_MX, as the first exceeding width WF1. And, when the first component strength maximum value SF1_MX does not exceed the first threshold value TH1, the knocking determination unit 52 sets 0 as the first exceeding width WF1.

For example, in the second side stop determination processing, as shown in the next equation, the knocking determination unit 52 calculates the retard angle amount of ignition timing θR, based on the first exceeding width WF1. Kr2 is a reflection coefficient of the second side stop determination processing, and it is set to a positive value. Since the retard angle amount θR decreases by an amount due to non-use of the second exceeding width WF2 as compared with the equation (3), the reflection coefficient Kr2 of the second side stop determination processing may be set larger than the reflection coefficient Kr1 of the normal determination processing.

$$\theta R = -Kr2 \times WF1 \quad (4)$$

<Calculation of Final Retard Angle Amount FθR>

As shown in the next equation, the knocking determination unit 52 performs the normal determination processing or the second side stop determination processing corresponding to one knocking determination period, and calculates a final retard angle amount FθR, by integrating the retard angle amount θR every time when calculating the retard angle amount of ignition timing θR. Then, as shown in the equation (6) described below, the ignition timing is retarded by the final retard angle amount FθR. "(n)" described below shows the value calculated at this time processing timing, and "(n−1)" shows the value calculated at the last time processing timing.

$$F\theta R(n) = \min\{F\theta R(n-1) + \theta R(n) + Ka, F\theta \max\} \quad (5)$$

Herein, Ka is a preliminarily set returning amount to the advance angle side, and is set to a positive value. When determining that the knocking does not occur and the retard angle amount θR is 0, Ka makes the final retard angle amount FθR return to the advance angle side gradually. Fθmax is a preliminarily set maximum value on the advance angle side, and is an upper limitation value of the final retard angle amount FθR. min {A, B} is a function which outputs the minimum value of A and B.

1-2-3. Ignition Control Unit 53

In the present embodiment, the ignition control unit 53 retards the ignition timing by the retard angle amount (in this example, the final retard angle amount FθR) calculated by the knocking determination unit 52. The ignition control unit 53 calculates a basic ignition timing OB based on the operating condition of the internal combustion engines 1, such as the rotational speed and the intake air amount. The basic ignition timing θB is normally set to an ignition timing when the torque becomes the maximum. Then, as shown in the next equation, the ignition control unit 53 sets a value obtained by adding the final retard angle amount FθR to the basic ignition timing θB, as the final ignition timing θIG.

$$\theta IG = \theta B + F\theta R \quad (6)$$

The final ignition timing θIG is an angle before the top dead center of the piston 5, its retard angle side is negative, and its advance angle side is positive. The controller 50 performs an energization control to the ignition coil 16 so that discharge of the ignition plug 18 starts at the final ignition timing θIG (the crank angle), based on the final ignition timing θIG and the crank angle.

1-2-4. Flowchart

Figure 8:
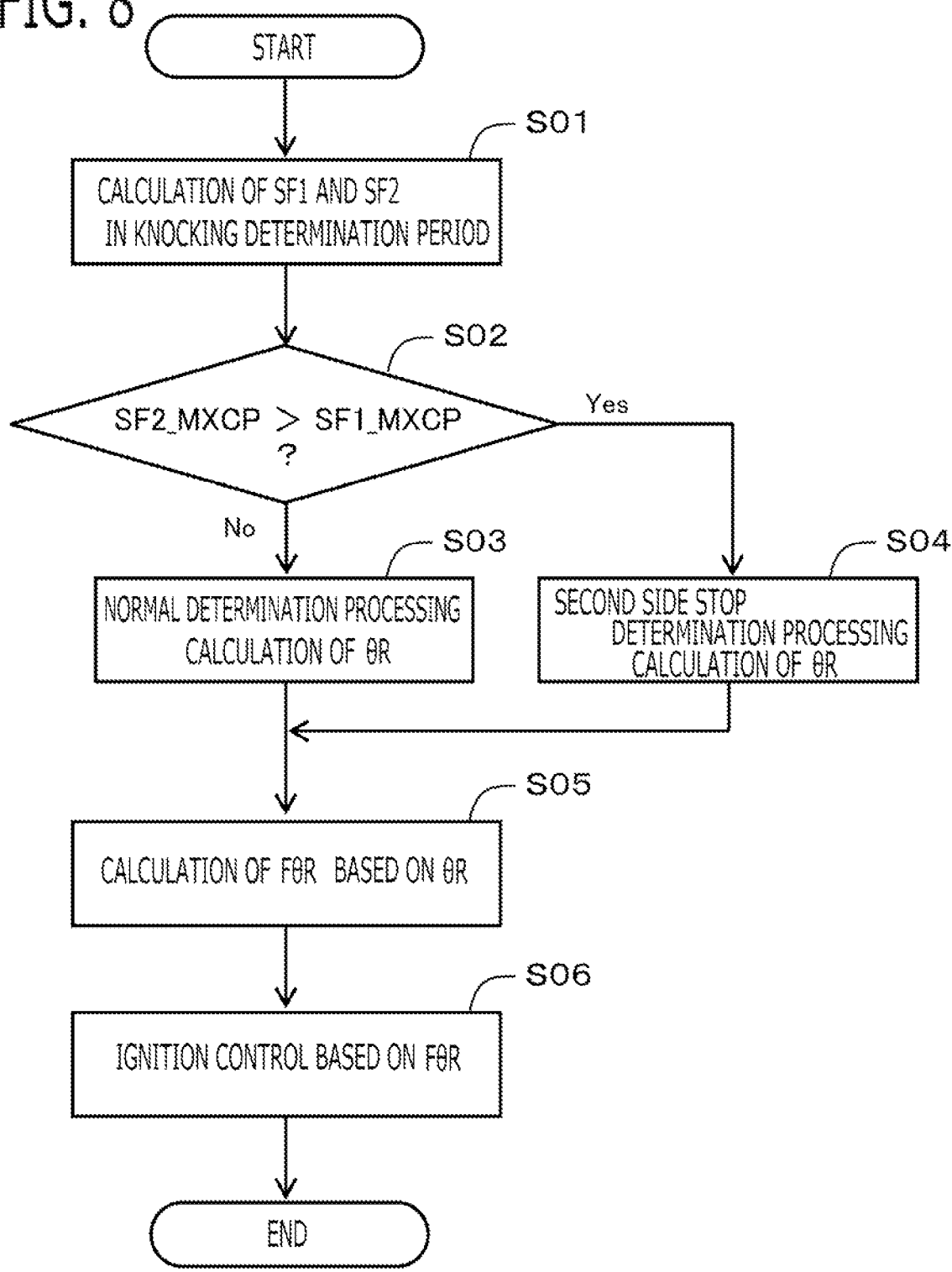
FIG. 8 is a flowchart for showing the processing of the controller according to Embodiment 1.

The processing of the controller 50 (the control method for internal combustion engine) according to Embodiment 1 will be explained based on the flowchart represented in FIG. 8.

In the step S01, as mentioned above, the knocking signal calculation unit 51 calculates the strength of the component of the first frequency band SF1 and the strength of the component of the second frequency band SF2 which are included in the output signal of the knocking sensor 12, in the knocking determination period which is set corresponding to the combustion stroke. The strength of the component of the first frequency band SF1 and the strength of the component of the second frequency band SF2 which were calculated at each timing of the knocking determination period are stored in the storage apparatus 91, such as RAM.

Then, after the knocking determination period ends, in the step S02, the knocking determination unit 52 calculates the maximum value SF2_MXCP of the strength of the component of the second frequency band and the maximum value SF1_MXCP of the strength of the component of the first frequency band which were calculated in the comparison period which is set corresponding to the knocking determination period. Then, the knocking determination unit 52 determines whether the maximum value SF2_MXCP of the strength of the component of the second frequency band exceeds the maximum value SF1_MXCP of the strength of the component of the first frequency band. When not exceeding, it advances to the step S03 and performs the normal determination processing, and when exceeding, it advances to the step S04 and performs the second side stop determination processing.

In the step S03, in the normal determination processing, the knocking determination unit 52 determines whether the knocking occurred in the combustion stroke, based on the strength of the component of the first frequency band SF1 and the strength of the component of the second frequency band SF2 which were calculated in the knocking determination period. In the present embodiment, as mentioned above, the knocking determination unit 52 performs, in the knocking determination period, the first comparison which compares the strength of the component of the first frequency band SF1 with the first threshold value TH1, performs the second comparison which compares the strength of the component of the frequency band SF2 with the second threshold value TH2, and determines whether the knocking occurred, based on one or both of the comparison result of the first comparison and the comparison result of the second comparison.

And, in the present embodiment, in the normal determination processing, the knocking determination unit 52 changes the ignition timing based on the determination result of knocking occurrence. In the present embodiment, as mentioned above, the knocking determination unit 52 calculates the retard angle amount of ignition timing θR, based on the first exceeding width WF1 that the first component strength maximum value SF1_MX exceeds the first threshold value TH1, and the second exceeding width WF2 that the second component strength maximum value SF2_MX exceeds the second threshold value TH2.

On the other hand, in the step S04, in the second side stop determination processing, without using the strength of the component of the second frequency band SF2, the knocking determination unit 52 determines whether the knocking occurred in the combustion stroke, based on the strength of the component of the first frequency band SF1 and the strength of the component of the frequency band SF2 which were calculated in the knocking determination period. In the present embodiment, as mentioned above, the knocking determination unit 52 performs, in the knocking determination period, a first comparison which compares the strength of the component of the first frequency band SF1 with a first threshold value TH1, and determines whether the knocking occurred, based on the comparison result of the first comparison.

And, in the present embodiment, in the second side stop determination processing, the knocking determination unit 52 changes the ignition timing based on the determination result of knocking occurrence. In the present embodiment, as mentioned above, the knocking determination unit 52 calculates the retard angle amount of ignition timing θR, based on the first exceeding width WF1 that the first component strength maximum value SF1_MX exceeds the first threshold value TH1.

Then, in the step S05, as shown in the equation (5), the knocking determination unit 52 calculates the final retard angle amount FθR, based on the retard angle amount θR calculated by the normal determination processing or the second side stop determination processing.

In the step S06, as mentioned above, the ignition control unit 53 retards the ignition timing by the retard angle amount (in this example, the final retard angle amount FθR) calculated by the knocking determination unit 52. Then, the ignition control unit 53 performs the energization control to the ignition coil 16 based on the ignition timing.

2. Embodiment 2

Next, the controller 50 according to Embodiment 2 will be explained. The explanation for constituent parts the same as those in Embodiment 1 will be omitted. The basic configuration of the controller 50 according to the present embodiment is the same as that of Embodiment 1. Embodiment 2 is different from Embodiment 1 in setting of the comparison period.

Figure 9:
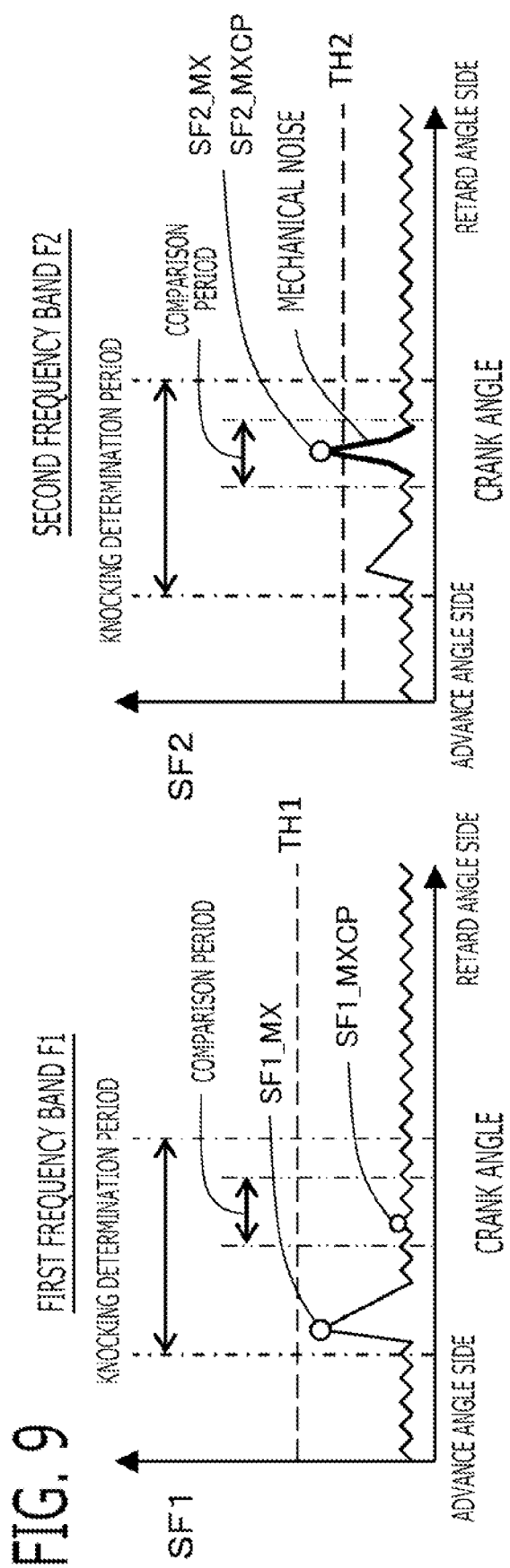
FIG. 9 is a figure for explaining the behavior when the mechanical noise is superimposed according to Embodiment 2.

As shown in the example of FIG. 9 in which the mechanical noise is superimposed in knocking non-occurrence, the occurrence timing of vibration component by burning becomes almost the same between the first frequency band F1 and the second frequency band F2. On the other hand, the occurrence timing of the mechanical noise component may be different from the occurrence timing of the vibration component by burning. Accordingly, by setting the comparison period in accordance with the occurrence timing of the mechanical noise component, it is thought that the determination accuracy of presence or absence of superimposing of the mechanical noise can be improved.

Then, in the present embodiment, the knocking determination unit 52 sets the comparison period to a period including a time point when the strength of the component of the second frequency band SF2 becomes the maximum in the knocking determination period. For example, the knocking determination unit 52 sets the comparison period to a period centering on the time point when the strength of the component of the second frequency band SF2 becomes the maximum. The knocking determination unit 52 sets the comparison period to a predetermined crank angle interval (±α degrees) centering on a crank angle when the strength of the component of the second frequency band SF2 becomes the maximum.

According to this configuration, as shown in the example of FIG. 9, if the occurrence timing of the mechanical noise component is different from the occurrence timing of the vibration component by burning, since the comparison period is set to a period when the mechanical noise occurs and the vibration component by burning does not occur in the second frequency band F2, the vibration component by burning does not occur in the comparison period of the first frequency band F1. Accordingly, the maximum value SF1_MXCP of the strength of the component of the first frequency band in the comparison period becomes lower than maximum value SF1_MX of the strength of the component of the first frequency band in the knocking determination period, and becomes lower than maximum value SF2_MXCP of the strength of the component of the second frequency band in the comparison period, and it can be determined that the mechanical noise is superimposed. Therefore, the presence or absence of superimposing of the mechanical noise can be determined with good accuracy.

Figure 10:
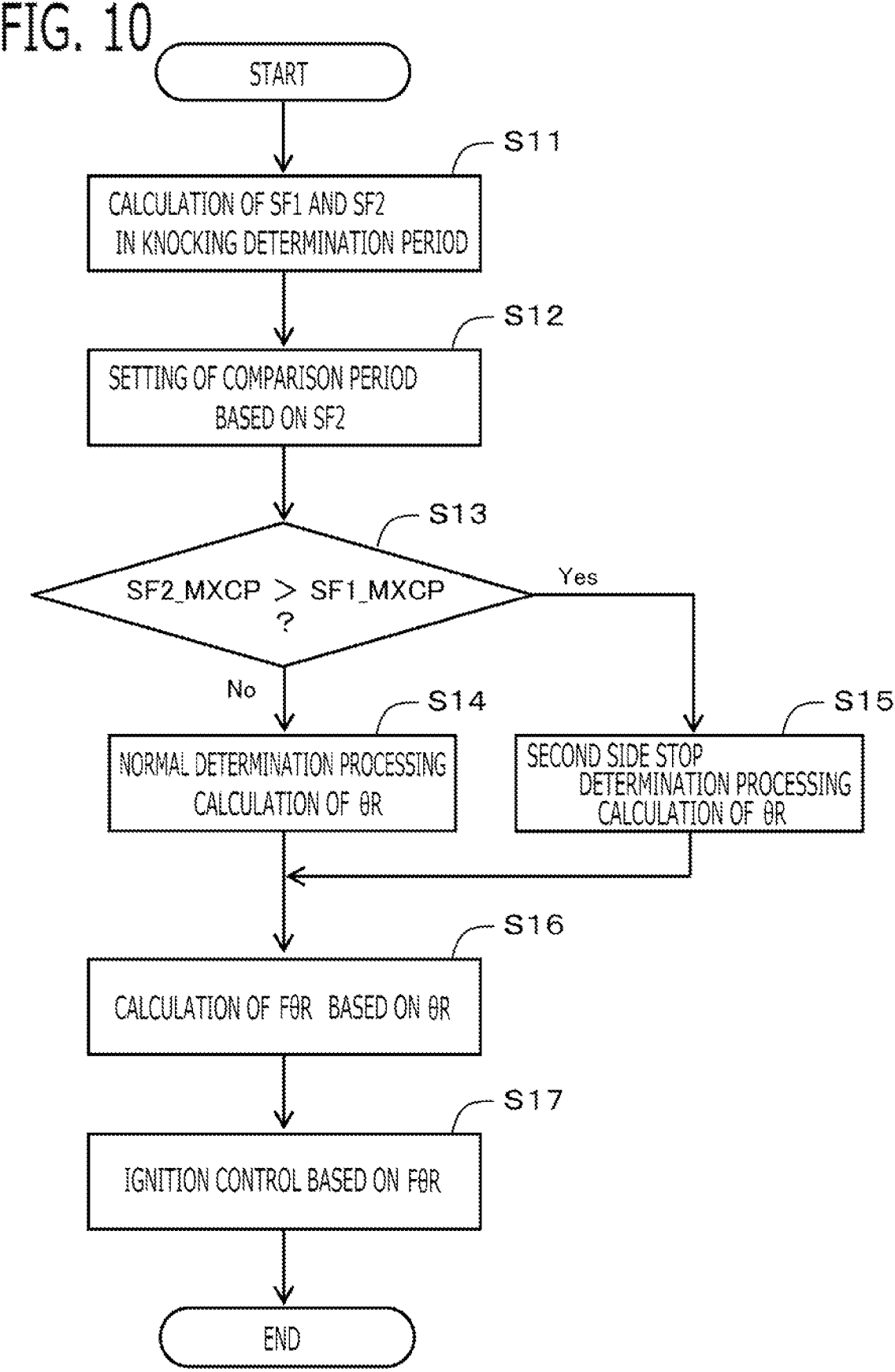
FIG. 10 is a flowchart for showing the processing of the controller according to Embodiment 2.

The processing of the controller 50 (the control method for internal combustion engine) according to the present embodiment will be explained based on the flowchart represented in FIG. 10. Since processing of the step S11, and the step S13 to the step S17 is the same as processing from the step S01 to the step S06 of FIG. 8 of Embodiment 1, explanation is omitted.

In the present embodiment, in the step S12, after the knocking determination period ends, the knocking determination unit 52 determines a time point when the strength of the component of the second frequency band SF2 becomes the maximum in the knocking determination period, based on the strength of the component of the second frequency band SF2 calculated in the knocking determination period. Then, as mentioned above, the knocking determination unit 52 sets the comparison period to a period including a time point when the strength of the component of the second frequency band SF2 becomes the maximum in the knocking determination period.

3. Embodiment 3

Next, the controller 50 according to Embodiment 2 will be explained. The explanation for constituent parts the same as those in Embodiment 1 will be omitted. The basic configuration of the controller 50 according to the present embodiment is the same as that of Embodiment 1. Embodiment 3 is different from Embodiment 1 in the determination method of execution and non-execution of the second side stop determination processing.

Figure 11:
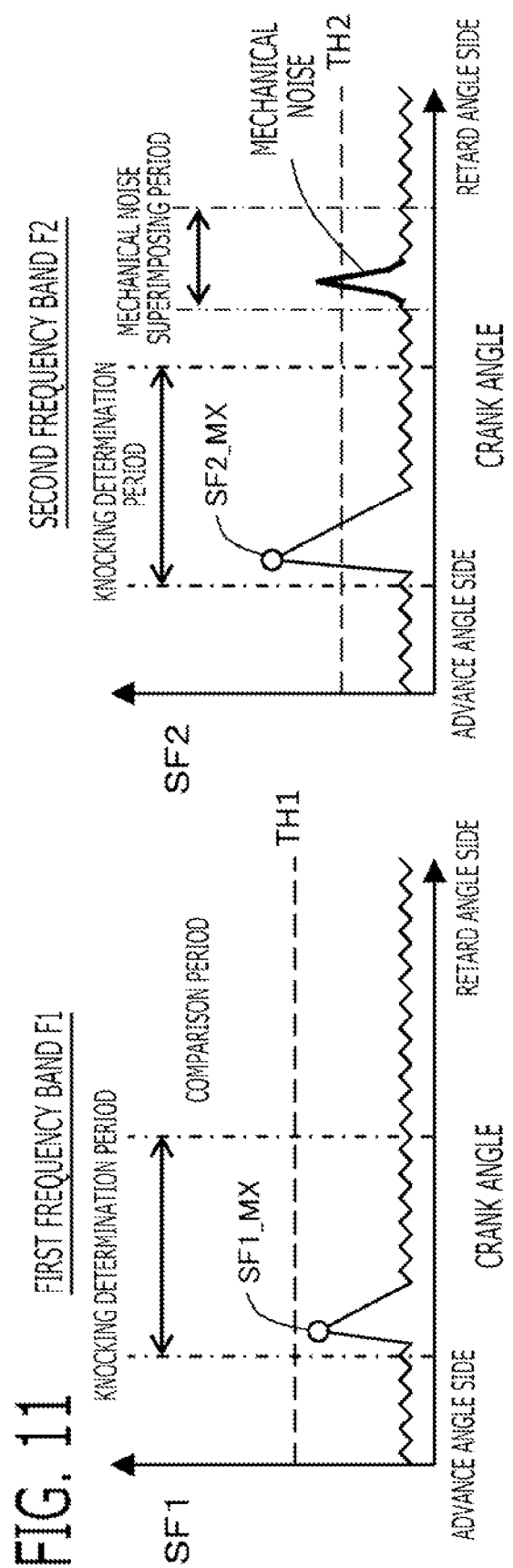
FIG. 11 is a figure for explaining the behavior when the mechanical noise is superimposed according to Embodiment 3.

When the opening and closing timing of the intake valve 14 is changed by the variable valve timing mechanism 14a, the valve closing timing of the intake valve 14 of other combustion chamber overlaps with the knocking determination period, or does not overlap, according to change of the opening and closing timing. Accordingly, as shown in FIG. 11, when the valve closing timing does not overlap with the knocking determination period, since a possibility that the mechanical noise is superimposed on the strength of the component of the second frequency band SF2 in the knocking determination period is low, it is not necessary to perform the second side stop determination processing. Although occurrence frequency is low, when the vibration component by burning increases, the second component strength maximum value SF2_MX may become higher than the first component strength maximum value SF1_MX.

Then, in the present embodiment, the knocking determination unit 52 determines whether the valve closing timing overlaps with the knocking determination period, based on a control value of the variable valve timing mechanism, and does not perform the second side stop determination processing, when determining that it does not overlap. For example, the knocking determination unit 52 obtains a phase information of the opening and closing timing of the intake valve of the specific combustion chamber whose possibility of overlapping is high, as the control value of the variable valve timing mechanism, calculates the valve closing timing of the intake valve of the specific combustion chamber based on the phase information, and calculates an occurrence period of the mechanical noise by valve closing based on the valve closing timing. Then, the knocking determination unit 52 determines whether the occurrence period of the mechanical noise overlaps with the knocking determination period.

According to this configuration, when determining that the valve closing timing does not overlap with the knocking determination period based on the control value of the variable valve timing mechanism, since a possibility that the mechanical noise is superimposed on the strength of the component of the second frequency band SF2 in the knocking determination period is low, execution of the unnecessary second side stop determination processing can be suppressed. Then, although occurrence frequency is low, as shown in FIG. 11, when the second component strength maximum value SF2_MX becomes higher than the first component strength maximum value SF1_MX due to the increase in the vibration component by burning, knocking occurrence can be detected.

Figure 12:
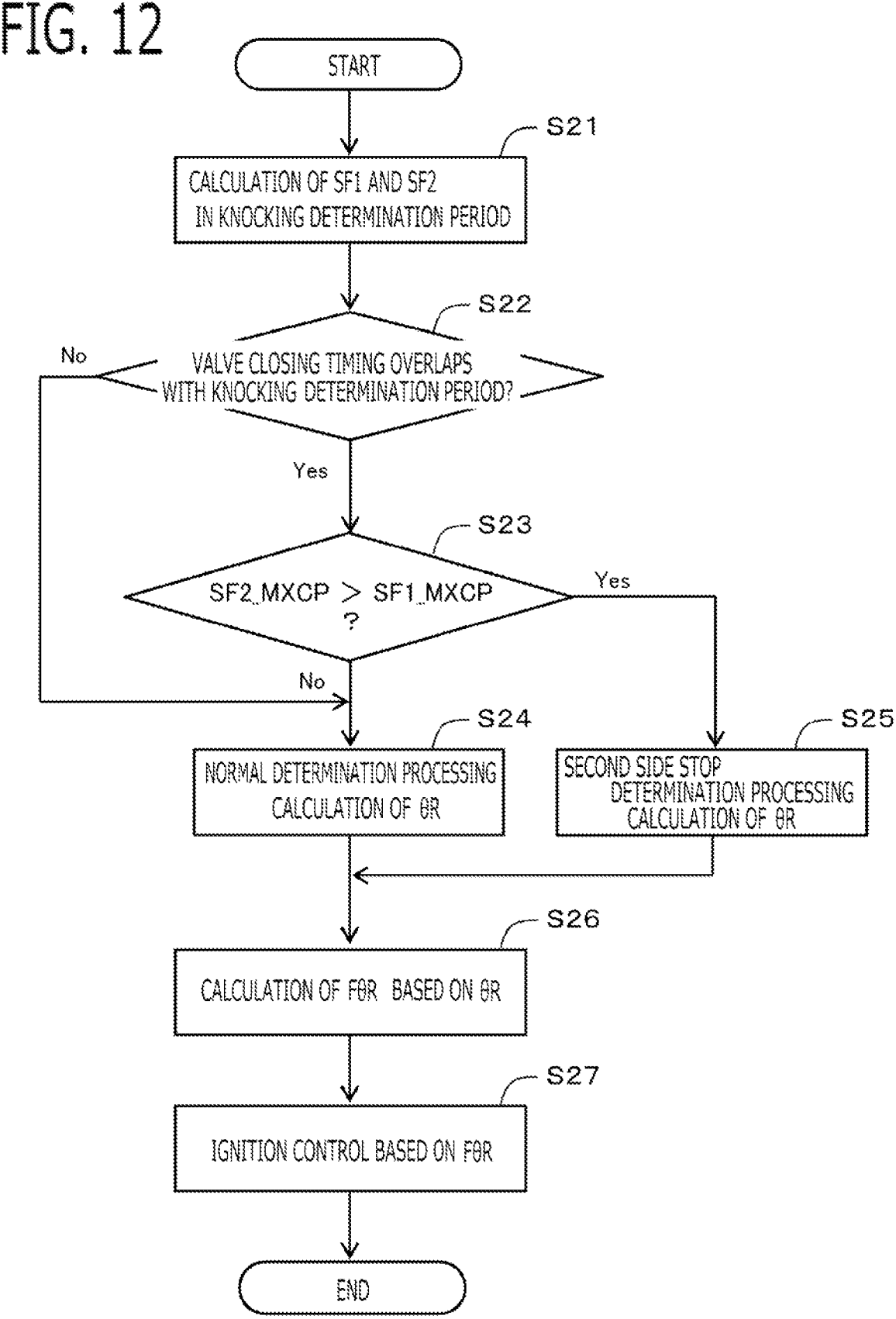
FIG. 12 is a flowchart for showing the processing of the controller according to Embodiment 3.

The processing of the controller 50 (the control method for internal combustion engine) according to the present embodiment will be explained based on the flowchart represented in FIG. 12. Since processing of the step S21, and the step S23 to the step S27 is the same as processing from the step S01 to the step S06 of FIG. 8 of Embodiment 1, explanation is omitted.

In the present embodiment, in the step S22, as mentioned above, the knocking determination unit 52 determines whether the valve closing timing of the intake valve of other combustion chamber overlaps with the knocking determination period based on the control value of the variable valve timing mechanism. When determining to overlap, it advances to the step S23, the presence or absence of superimposing of the mechanical noise is determined, and the normal determination processing or the second side stop determination processing is performed. When determining not to overlap, it advances to the step S24, and the normal determination processing is performed.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above Embodiment 3, there was explained the case where the variable valve timing mechanism 14a is provided in the intake valve 14, and the knocking determination unit 52 determines whether the valve closing timing of the intake valve overlaps with the knocking determination period based on the control value of the intake variable valve timing mechanism 14a. However, embodiments of the present disclosure are not limited to the foregoing case. That is to say, the variable valve timing mechanism may be provided in the exhaust valve, and the knocking determination unit 52 may determine whether the valve closing timing of the exhaust valve overlaps with the knocking determination period based on a control value of the variable valve timing mechanism of the exhaust valve.

(2) In each of the above-mentioned Embodiments, there was explained the case where the knocking determination unit 52 changes the ignition timing based on the determination result of knocking occurrence. However, embodiments of the present disclosure are not limited to the foregoing case. That is to say, the knocking determination unit 52 may change control parameters of the internal combustion engines 1 other than the ignition timing, based on the determination result of knocking occurrence. For example, the control parameters are the valve opening and closing timing of the variable valve timing mechanism, the intake air amount, the air-fuel ratio, the compression ratio, or the like.

(3) In Embodiment 3, when determining that the valve closing timing overlaps with the knocking determination period, similar to Embodiment 2, the knocking determination unit 52 may sets the comparison period to a period including a time point when the strength of the component of the second frequency band SF2 becomes the maximum in the knocking determination period.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Internal Combustion Engine, 12: Knocking Sensor, 14a: Variable Valve Timing Mechanism, 14: Intake Valve, 15: Exhaust Valve, 25: Combustion Chamber, 50: Controller for Internal Combustion Engine, 51: Knocking Signal Calculation Unit, 52: Knocking Determination Unit, 53: Ignition Control Unit, 54: Valve Timing Control Unit, F1: First Frequency Band, F2: Second Frequency Band, SF1: Strength of Component of First Frequency Band, SF2: Strength of Component of Second Frequency Band, SF1_MX: Maximum value of strength of component of first frequency band in knocking determination period, SF2_MX: Maximum value of strength of component of second frequency band in knocking determination period, SF1_MXCP: Maximum value of strength of component of first frequency band in comparison period, SF2_MXCP: Maximum value of strength of component of second frequency band in comparison period, TH1: First threshold value, TH2: Second threshold value, θR: Retard angle amount of ignition timing

What is claimed is:

1. A controller for internal combustion engine, comprising at least one processor configured to implement:
    a knocking signal calculator that calculates a strength of a component of a first frequency band and a strength of a component of a second frequency band which are included in an output signal of a knocking sensor provided in an internal combustion engine, wherein the second frequency band is a higher frequency than the first frequency band; and
    a knocking determiner that determines whether knocking occurred in a combustion stroke, based on the strength of the component of the first frequency band and the strength of the component of the second frequency band which were calculated in a knocking determination period which is set corresponding to the combustion stroke,
    wherein when a maximum value of the strength of the component of the second frequency band in a comparison period which is set corresponding to the knocking determination period exceeds a maximum value of the strength of the component of the first frequency band in the comparison period, the knocking determiner performs a second side stop determination processing that determines whether the knocking occurred, based on the strength of the component of the first frequency band, without using the strength of the component of the second frequency band.

2. The controller for internal combustion engine according to claim 1,
    wherein the knocking determiner sets the comparison period to a period including a time point when the strength of the component of the second frequency band becomes a maximum in the knocking determination period.

3. The controller for internal combustion engine according to claim 1, further comprising
    a valve timing controller that controls a variable valve timing mechanism which changes a valve closing timing of one or both of an intake valve and an exhaust valve of a combustion chamber,
    wherein the knocking determiner determines whether the valve closing timing overlaps with the knocking determination period, based on a control value of the variable valve timing mechanism, and
    does not perform the second side stop determination processing, when determining that these do not overlap.

4. The controller for internal combustion engine according to claim 1,
    wherein the knocking determiner changes an ignition timing, based on a determination result of knocking occurrence.

5. The controller for internal combustion engine according to claim 1,
    wherein when not performing the second side stop determination processing, the knocking determiner, in the knock determination period, performs a first comparison which compares the strength of component of the first frequency band with a first threshold value, performs a second comparison which compares the strength of the component of the second frequency band with a second threshold value, and determines whether the knocking occurred, based on one or both of a comparison result of the first comparison and a comparison result of the second comparison; and
    when performing the second side stop determination processing, the knocking determiner, in the knock determination period, performs the first comparison which compares the strength of the component of the first frequency band with the first threshold value, and determines whether the knocking occurred, based on the comparison result of the first comparison.

6. The controller for internal combustion engine according to claim 5, wherein the second threshold value is set to a value less than the first threshold value.

7. The controller for internal combustion engine according to claim 1,
    wherein when not performing the second side stop determination processing, the knocking determiner calculates a retard angle amount of ignition timing, based on a square root of an addition value of a square value of a first exceeding width that the strength of the component of the first frequency band exceeds a first threshold value, and a square value of a second exceeding width that the strength of the component of the second frequency band exceeds a second threshold value; and
    when performing the second side stop determination processing, the knocking determiner calculates the retard angle amount of ignition timing, based on the first exceeding width that the strength of the component of the first frequency band exceeds the first threshold value.

8. A control method for internal combustion engine, comprising:
    calculating a strength of a component of a first frequency band and a strength of a component of a second frequency band which are included in an output signal of a knocking sensor provided in an internal combustion engine, wherein the second frequency band is a higher frequency than the first frequency band; and
    determining whether knocking occurred in a combustion stroke, based on the strength of the component of the first frequency band and the strength of the component of the second frequency band which were calculated in a knocking determination period which is set corresponding to the combustion stroke,
    wherein, when a maximum value of the strength of the component of the second frequency band in a comparison period which is set corresponding to the knocking determination period exceeds a maximum value of the strength of the component of the first frequency band in the comparison period, performing a second side stop determination processing that determines whether the knocking occurred, based on the strength of the component of the first frequency band, without using the strength of the component of the second frequency band.

* * * * *